United States Patent
Van Vugt

(10) Patent No.: US 7,353,002 B2
(45) Date of Patent: Apr. 1, 2008

(54) MEASURING A TALKING QUALITY OF A COMMUNICATION LINK IN A NETWORK

(75) Inventor: Jeroen Martijn Van Vugt, The Hague (NL)

(73) Assignee: Koninklijke KPN N.V., The Hague (NL)

( * ) Notice: Subject to any disclaimer, the term of this patent is extended or adjusted under 35 U.S.C. 154(b) by 0 days.

(21) Appl. No.: 10/564,462

(22) PCT Filed: Aug. 18, 2004

(86) PCT No.: PCT/EP2004/009299

§ 371 (c)(1),
(2), (4) Date: Jan. 12, 2006

(87) PCT Pub. No.: WO2005/022876

PCT Pub. Date: Mar. 10, 2005

(65) Prior Publication Data

US 2006/0166624 A1    Jul. 27, 2006

Related U.S. Application Data

(60) Provisional application No. 60/498,525, filed on Aug. 28, 2003.

(51) Int. Cl.
*H04B 17/00* (2006.01)
(52) U.S. Cl. ............... 455/67.11; 455/67.13; 455/135; 455/161.3; 379/406.1; 379/416
(58) Field of Classification Search ............. 455/67.11, 455/67.13, 135, 161.3, 277.2; 379/416, 406.1
See application file for complete search history.

(56) References Cited

U.S. PATENT DOCUMENTS

| 5,848,384 | A | * | 12/1998 | Hollier et al. | 704/231 |
| 6,424,635 | B1 | | 7/2002 | Song | 370/286 |
| 7,027,982 | B2 | * | 4/2006 | Chen et al. | 704/230 |
| 2003/0053618 | A1 | | 3/2003 | Marchok et al. | |
| 2003/0115041 | A1 | * | 6/2003 | Chen et al. | 704/200.1 |
| 2004/0042617 | A1 | * | 3/2004 | Beerends et al. | 379/416 |
| 2005/0159944 | A1 | * | 7/2005 | Beerends | 704/225 |

FOREIGN PATENT DOCUMENTS

EP    1 206 104    5/2002

* cited by examiner

*Primary Examiner*—Sanh D. Phu
(74) *Attorney, Agent, or Firm*—Michaelson & Associates; Peter L. Michaelson

(57) ABSTRACT

Device and method for measuring a talking quality of a communication link in a communications network (10). The device comprises measurement means (22; 31, 36) connected to the communication link, which are arranged to subject a degraded speech signal s'(t) with respect to a reference speech signal s(t) to an objective measurement technique for measuring a perceptual quality of means are arranged for producing a quality signal (q) which represents an estimated value concerning the talking quality degradation. The degraded speech signal comprises a returned signal r(t). The measurement means (22; 31, 36) are arranged to execute the objective effects in consequence of noise present in the returned signal. The objective measurement technique comprises the determination of a threshold noise level by determining a local minimum value of the degraded speech signal s'(t).

14 Claims, 5 Drawing Sheets

MEASURING A TALKING QUALITY OF A COMMUNICATION LINK IN A NETWORK

FIELD OF THE INVENTION

The present invention relates to the area of measuring the talking quality of communication links in telecommunications systems, more in particular to modelling the effects resulting from (talker) echo and the presence of (background) noise switching in particular. The telecommunication system may e.g. be a (mobile) telephone communication system or a Voice over Internet Protocol (VoIP) system, using an IP network to provide communication links between two parties.

PRIOR ART

Such a method and system are known from European patent application EP-A-1 206 104 of the same applicant as the present application, which is incorporated herein by reference. This method has already been put forward as a standard ITU-T procedure for measuring talking quality, and is referenced as the Perceptual Echo and Sidetone Quality Measure (PESQM).

The known method and system have the disadvantage that in certain circumstances, the method yields an erroneous output, in particular when in the returned signal the noise level minimum is estimated at too low a level. This can e.g. happen in Voice over IP systems, in which Voice Activation Detection can cause noise dips in the returned signal. As a result of too low an estimated background noise level, the difference between reference speech signal and returned speech signal is large, and hence a low quality indicator is output.

SUMMARY OF THE INVENTION

The present invention seeks to provide an improved quality measurement system and method (also called Perceptual Echo and Sidetone Quality Measurement, PESQM), which will provide an adequate and robust talking quality indicator in the presence of variation in background noise level.

According to a first aspect of the present invention, a method according to the preamble defined above is provided, comprising a main step of subjecting a degraded speech signal s'(t) with respect to a reference speech signal s(t) to an objective measurement technique (32) for measuring a perceptual quality of speech signals, and producing a quality signal q which represents an estimated value concerning the talking quality degradation, the degraded speech signal comprising a returned signal r(t), in which the objective measurement technique comprises a step of modelling masking effects in consequence of noise present in the returned signal comprising the determination of a threshold noise level, by determining a local minimum value of the degraded speech signal s'(t).

In the known PESQM method as described in EP-A-1 206 104, the noise level is estimated as the global minimum value, taken over the entire speech sample which is fed through the network. By determining the local minimum value of the returned signal, it is also possible to obtain an adequate and robust talking quality indicator in the case of a changing background noise level.

In a first embodiment of the present method, the reference speech signal s(t) comprises a silence period and the threshold noise level is determined in the part of the degraded speech signal s'(t) corresponding to the silence period in the reference speech signal s(t). During a silence period in the speech signal, the network characteristics will not change, and the returned signal will not include any echo signals or suppressed background noise levels, and a reliable threshold noise level can be determined. The silence period can e.g. be provided at the start of the reference speech signal s(t), with a duration of at least 0.5 sec, more preferably at least 0.9 sec. This way it is certain that no echo or background noise switching is present in the degraded speech signal s'(t) caused by speech activity before the silence period.

In a further embodiment, the threshold noise level is estimated as local minimum values of successive parts of the degraded speech signal s'(t). The talking quality indicator can then be determined reliably using the estimated threshold noise level in each successive part. This allows to dynamically follow the noise floor of the returned signal, which makes the talking quality indicator more robust against (gradually) changing noise floors in the returned signal.

In an even further embodiment, the threshold noise level is estimated as the local minimum value of the degraded speech signal s'(t) in a predefined value range. In the returned signal, positive peaks in the signal will be present which are due to the reference speech signal (sidetone) or echo's from the reference speech signal (echo).

Also, excursions may be present to a lower noise level, e.g. due to background noise switching. By only determining the minimum value in those parts of the returned signal in which the values are between two boundary values, the true noise level can be determined, which will result in a reliable talking quality indicator.

In an even further embodiment, the main step comprises a first processing step of processing the degraded speech signal s'(t) and generating a first representation signal R'(t,f), a second processing step of processing the reference speech signal s(t) and generating a second representation signal R(t,f), a step of subtracting the first representation signal from the second representation signal as to produce a difference signal D(t,f), a first substep of producing an estimated value Ne of the loudness of the noise present in the returned signal, a second substep of noise suppression carried out on the difference signal using said produced estimated value Ne as to produce the modified difference signal D'(t,f), a step of integrating the modified difference signal D'(t,f) with respect to frequency and time as to produce the quality signal q. This embodiment provides an efficient implementation of a calculation method for determining the talking quality indicator by a number of transformations in the time and frequency domain.

In a further aspect, the present invention relates to a device for measuring the talking quality of a communication link in a communications network, the device comprising measurement means connected to the communication link, the measurement means being arranged to subject a degraded speech signal s'(t) with respect to a reference speech signal s(t) to an objective measurement technique for measuring a perceptual quality of speech signals, and producing a quality signal (q) which represents an estimated value concerning the talking quality degradation, the degraded speech signal comprising a returned signal r(t), in which the measurement means are arranged to execute the objective measurement technique by modelling masking effects in consequence of noise present in the returned signal in which the objective measurement technique comprises the determination of a threshold noise level by determining a local minimum value of the degraded speech signal s'(t). Further embodiments of the present device are described in the dependent claims, and the present device provides advantages as described above in relation to the present method.

SHORT DESCRIPTION OF DRAWINGS

The present invention will be discussed in more detail below, using a number of exemplary embodiments, with reference to the attached drawings, in which FIG. 1 schematically shows an example of a usual telephone link in a telecommunications network;

FIG. 2 schematically shows an earlier described set-up for measuring a talking quality of a telephone link using a known objective measurement technique for measuring a perceptual quality of speech signals;

FIG. 3 schematically shows a device for an objective measurement of a talking quality of a telephone link according to the invention to be used in the set-up of FIG. 2;

Figure 3:
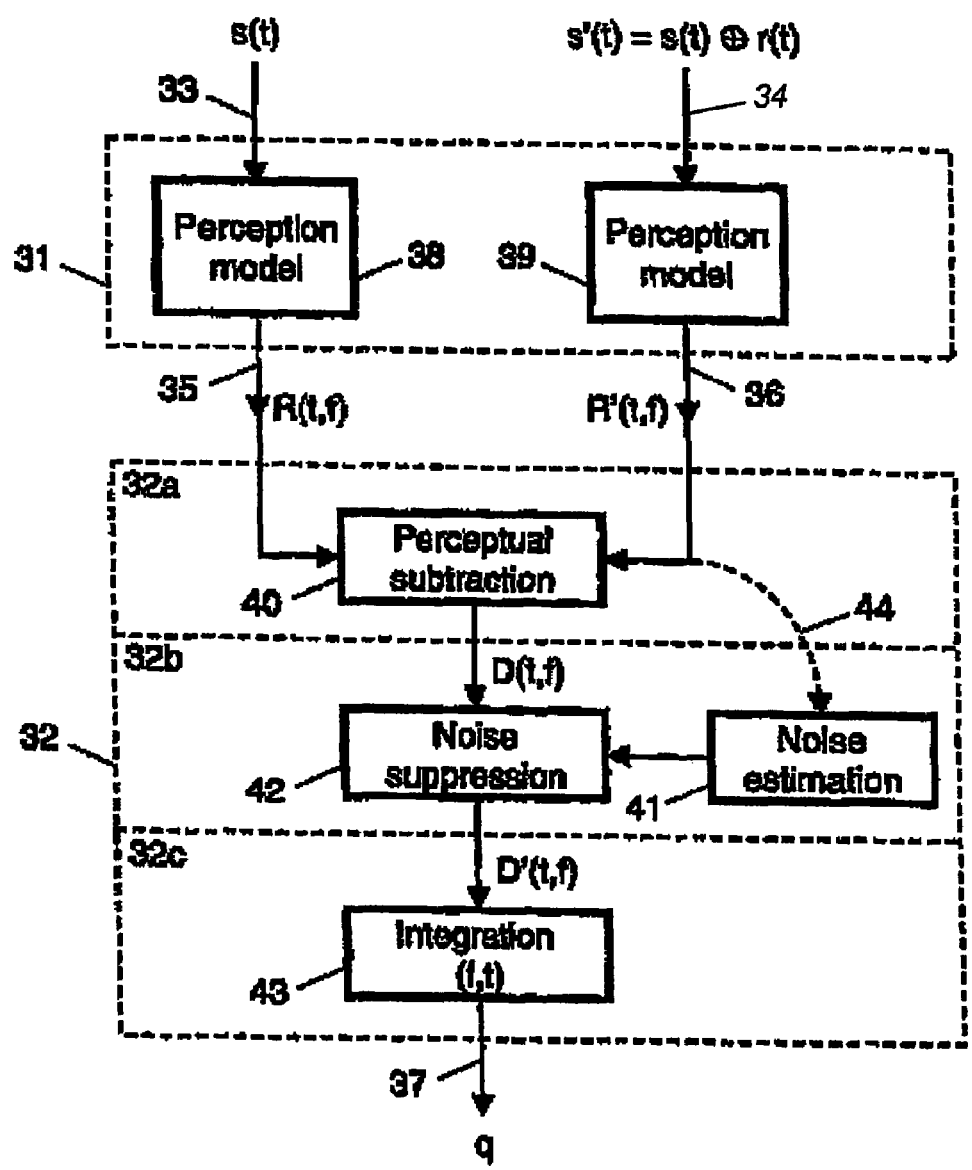
Figure 8:
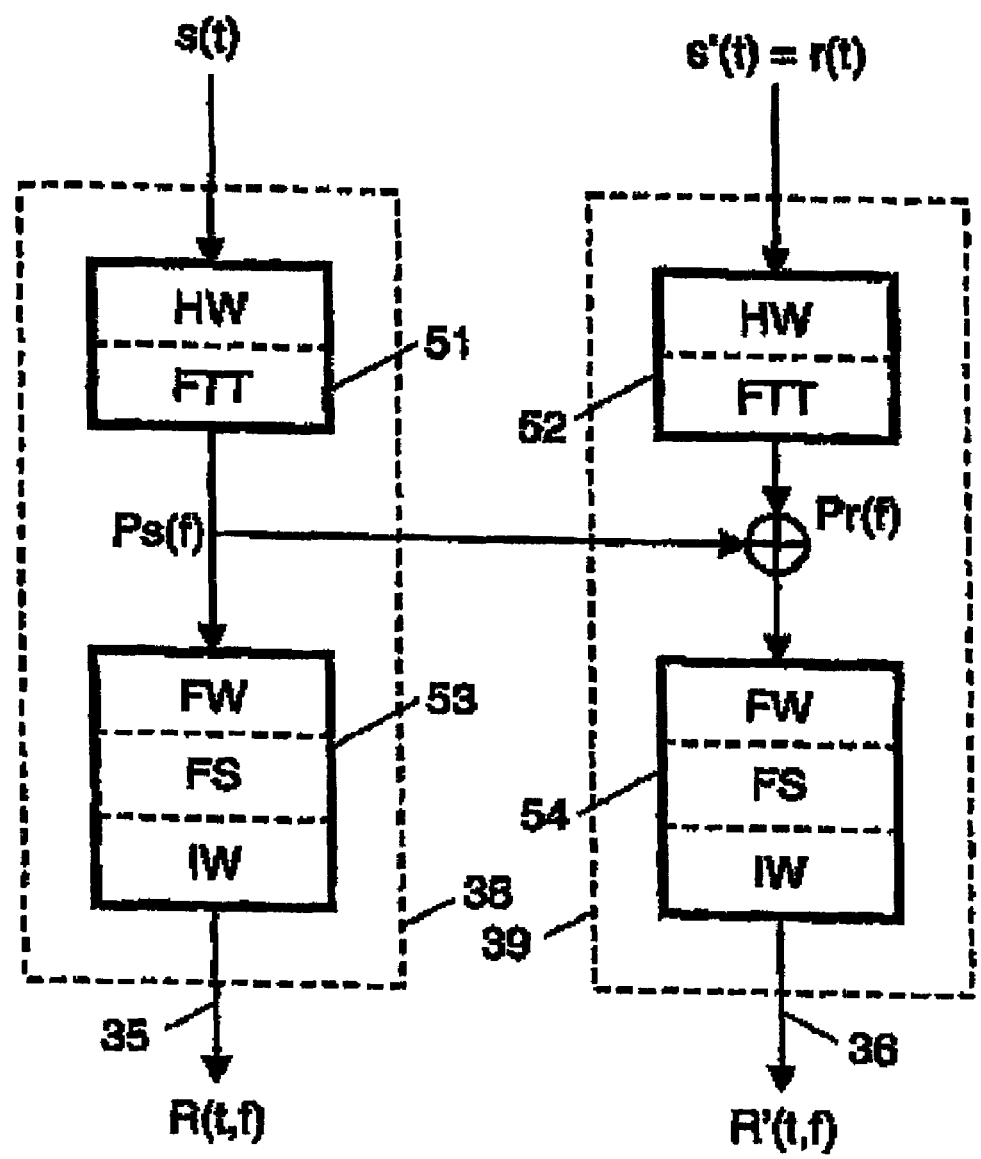

FIG. 8 schematically shows a modification in a further part of the device shown in FIG. 3.

DETAILED DESCRIPTION OF EXEMPLARY EMBODIMENTS

Delay and echo play an increasing role in the quality of telephony services because modern wireless and/or packet based network techniques, like GSM, UMTS, DECT, IP and ATM inherently introduce more delay than the classical circuit switching network techniques like SDH and PDH. Delay and echo together with side tone determine how a talker perceives his own voice in a telephone link. The quality with which he perceives his own voice is defined as the talking quality. It should be distinguished from the listening quality, which deals with how a listener perceives other voices (and music). Talking and listening quality together with the interaction quality determine the conversational quality of a telephone link. Interaction quality is defined as the ease of interacting with the other party in a telephone call, dominated by the delay in the system and the way it copes with double talk situations. The present invention is related to the objective measurement of talking quality of a communication (telephone) link, and more particular to account for the influence of noise therein.

Figure 1:
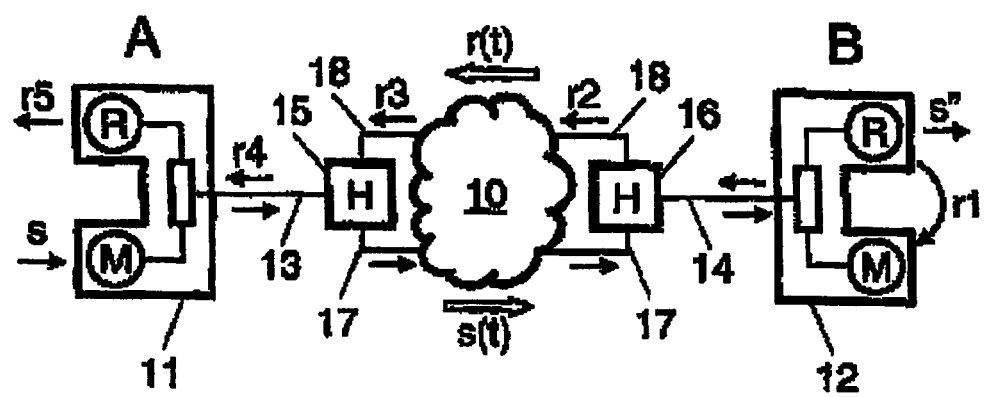

FIG. 1 schematically shows an example of a usual telephone link established between an A subscriber and a B subscriber of a telecommunications network 10. Telephone sets 11 and 12 of the A subscriber and the B subscriber, respectively, are connected by way of two-wire connections 13 and 14 and four-wire interfaces, namely, hybrids 15 and 16, to the network 10. Through the network, the established telephone link has a forward channel including a two-wire part, i.c. two-wire connections 13 and 14, and a four-wire send part 17, over which speech signals from the A subscriber are conducted, and a return channel including a two-wire part, i.c. two-wire connections 14 and 13, and a four-wire receive part 18, over which speech signals from the B subscriber are conducted. A speech signal s striking the microphone M of the telephone set 11 of the A subscriber, is passed on, by way of the forward channel (13, 17, 14) of the telephone link, to the earphone R of telephone set 12, and becomes audible there for the B subscriber as a speech signal s" affected by the network. Each speech signal s(t) on the forward channel generally causes a returned signal r(t) which, particularly due to the presence of said hybrids, includes an electrical type of echo signal on the return channel (18, 13) of the telephone link, and this is passed on to the earphone R of the telephone set 11, and may therefore disturb the A subscriber there. Furthermore the acoustic and/or mechanical coupling of the earphone or loudspeaker signal to the microphone of the telephone set of the B subscriber may cause an acoustic type of echo signal back to the telephone set of the A subscriber, which contributes to the returned signal. In an end-to-end digital telephone link (such as in a GSM system or in a Voice-over-IP system) such acoustic echo signal is the only type of echo signal that contributes to the return signal.

Summarizing a returned signal r(t) may include, at various stages in the return channel of a telephone link as caused by a speech signal s(t) in the forward channel of the telephone link:

a signal r1 representing acoustic echo;

a signal r2 representing an electrical echo possibly in combination with the acoustic echo;

a signal r3 which represents the signal r2 as affected, i.e. delayed or distorted, by the network 10;

a signal r4 which represents the signal r3 in combination with a side tone signal, and a signal r5 which is an acoustic signal derived from the signal r4, that also includes the locally generated side tone.

The general system description of FIG. 1 above is particularly directed at a conventional telephone system using wire communication links. The present invention, however, is equally applicable to a mobile telephony system, in which the network 10 comprises RF links, as well as to a Voice over IP (VoIP) network, in which the network 10 comprises a computer network with Internet Protocol links.

Figure 2:
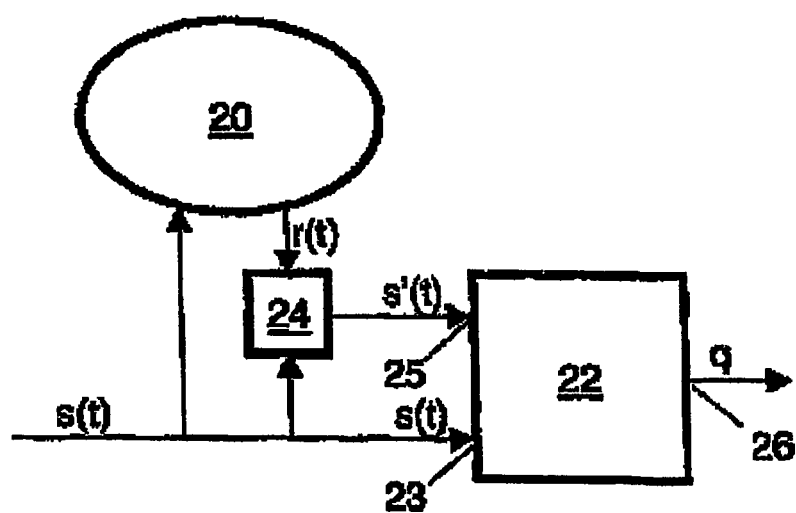

FIG. 2 shows schematically a set-up for measuring a talking quality of a communication link using a known objective measurement technique for measuring a perceptual quality of speech signals, as described in PCT/EP00/08884. The set-up comprises a system or telecommunications network under test 20, hereinafter for briefness' sake referred to as network 20, and a system 22 for the perceptual analysis of speech signals offered, hereinafter for briefness' sake only designated as quality measurement system 22. Any talker speech signal s(t) is used, on the one hand, as an input signal of the network 20 and, on the other hand, as first input (or reference) signal of the quality measurement system 22. A returned signal r(t) obtained from the network 20, which corresponds to the input talker speech signal s(t), is combined, in a combination circuit 24, with the talker speech signal s(t) to provide a combined speech signal s'(t), which is then used as a second input (or degraded) signal of the quality measurement system. In case of electrical measurements, r4 is measured. r(t) and s(t) are then combined (by 24) to s'(t) in which the local sidetone is accounted for. In case of acoustical measurements, r5 is measured, so that the local sidetone is also measured. In this case s'(t)=r(t). If necessary, the signal s(t) is scaled to the correct level before being combined with the returned signal r(t) in the combination circuit. An output signal q of the quality measurement system 22 represents an estimate of the talking quality, i.e. of the perceptual quality of the telephone link through the network 20 as it is experienced by the telephone user during talking on his own telephone set. Here use may be made of signals stored on data bases. These signals may be obtained or have been obtained by simulation or from a telephone set (e.g. signal r4 in the electrical domain or signal r5 in the acoustic domain) of the A subscriber in the event of an established link during speech silence of the B subscriber. The two-wire connection between the telephone subscriber access point and the four-wire interface with the network does not, or hardly, contribute to the echo component in the returned signal r(t) (of course, it does contribute to the echo component in a returned signal occurring in the return channel of the B subscriber of the telephone link). However, any such signal contribution has a short delay and, as a matter of fact, forms part of the side tone.

The signals s(t) and r(t) may also be tapped off from a four-wire part 17 of the forward channel and the four-wire part 18 of the return channel near the four-wire interface 15, respectively. This offers, as already described in reference [1], the opportunity of a permanent measurement of the talking quality in the event of established telephone links, using live traffic non-intrusively.

The system or network being tested may of course also be a simulation system, which simulates a telecommunications network.

FIG. 3 shows schematically an embodiment of the quality measurement system 22 for objectively measuring the perceptual quality of an audible signal. The quality measurement system 22 comprises a signal processor 31 and a combining arrangement 32. The signal processor is provided with signal inputs 33 and 34, and with signal outputs 35 and 36 coupled to corresponding signal inputs of the combining arrangement 32. A signal output 37 of the combining arrangement 32 is at the same time the signal output of the quality measurement system 22. The signal processor includes perception modelling means 38 and 39, respectively coupled to the signal inputs 33 and 34, for processing input signals s(t) and s'(t) and generating representation signals R(t,f) and R'(t,f) which form time/frequency representations of the input signals s(t) and s'(t), respectively, according to a perception model of the human auditory system. The representation signals are functions of time and frequency (Hz scale or Bark scale). The signal processing, as usual, is carried out frame-wise, i.e. the speech signals are split up in frames that are about equal to the window of the human ear (between 10 and 100 ms) and the loudness per frame is calculated on the basis of the perception model. Only for reasons of simplicity this frame-wise processing is not indicated in the figures.

The representation signals R(t,f) and R'(t,f) are passed to the combining arrangement 32 via the signal outputs 35 and 36. In the combining arrangement of the known PESQM-like algorithm (see EP-A-1 206 104) at first a difference signal D(t,f) of the representation signals is determined followed by various processing steps carried out on the difference signal. The last ones of the various processing steps imply integration steps over frequency and time resulting in a quality signal q available at the signal output 37.

For correctly measuring the talking quality, a step of modelling masking effects which noise present in the returned signal could have on perceived echo disturbances, is introduced. Such a modelling step could be based on a possible separation of echo components and noise components present in the returned signal r(t). However a reliable modelling could be reached in a different, simpler manner. This modelling step implies a specific noise suppression step carried out on the difference signal by using an estimated value for the noise. Therefore the combining arrangement 32 comprises:

in a first part 32a, a subtraction means 40 for perceptually subtracting the two representation signals R(t,f) and R'(t,f) received from the signal processor 31 and generating a difference signal D(t,f), in a second part 32b, a noise estimating means 41 for generating an estimated noise value Ne for the noise present in the input signal s'(t), and a noise suppression means 42 for deriving from the difference signal D(t,f) and the estimated noise value Ne a modified difference signal D'(t,f), and in a third part 32c, integration means 43 for integrating the modified difference signal D'(t,f) successively to frequency and time and generating the quality signal q.

In the known talking quality determination method and system according to EP-A-1 206 104, the estimated noise value Ne may be a predetermined value, e.g. derived from the type of telephone link, or is preferably obtained from one of the representation signals, i.c. R'(t,f), which is visualised in FIG. 3 by means of a broken dashed line between the signal output 36 with a signal input 44 of the noise estimation means 41. The representation signals R(t,f) and R'(t,f) are as usual loudness density functions of the reference and degraded speech signals s(t) and s'(t), respectively. The output signal of the subtraction means 40, i.c. D(t,f), represents the signed difference between the loudness densities of the degraded (i.e. distorted by the presence of echo, side tone and noise signals in the returned signal) and the reference signal (i.e. the original talker speech signal), preferably reduced by a small perceptual correction, i.c. a small density correction for so-called internal noise.

The resulting difference signal D(t,f), which is in fact a loudness density function, is subjected to a background masking noise estimation. The key idea behind this is that, because talkers during a telephone call will always have silent intervals in their speech, during such intervals (of course after the echo delay time) the minimum loudness of the degraded signal over time is almost completely caused by the background noise. In general, the talking quality is determined using a speech sample. Since the speech sample processing is carried out in frames, this minimum may be put equal to a minimum loudness density Ne found in the frames of the representation signal R'(t,f) corresponding to the complete speech sample. This minimum Ne can then be used to define a threshold value T(Ne) for setting the content of all frames of the difference signal D(t,f), that have a loudness below this threshold, to zero, leaving the content of the other frames unchanged. The set-to-zero frames and the unchanged frames together constitute a signal from which the modified difference signal D'(t,f), the output signal of the noise suppression means 42, is derived (see below).

In an advantageous embodiment of the known PESQM method, a small delta value is added to the threshold value T(Ne) as determined, to cancel contributions to the eventual talking quality measurement by small fluctuations in the returned signal.

Figure 4:
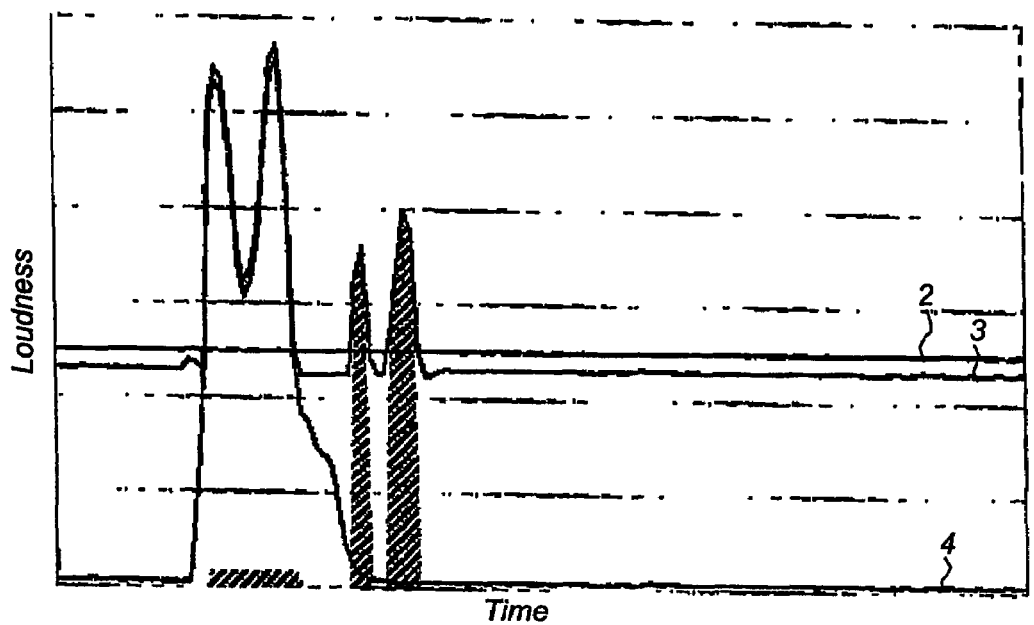
FIG. 4 shows a graph representing the reference speech signal, return signal, determined background noise level and the associated measure of talking quality according to the state of the art.

In the known method and system according to EP-A-1 206 104, the noise level is estimated using the entire returned distorted speech signal R'(t,f) corresponding to the speech sample used to determine the talking quality. This is visualised in the graph shown in FIG. 4, which shows the loudness representations in time of the input speech signal 4 (corresponding to the input signal s(t)), the returned signal 3 (corresponding to the returned signal r(t), and comprising a distorted signal and an echo signal), the estimated noise threshold value 2 (corresponding to the determined minimum noise level in the returned signal over the entire speech sample). The talking quality is then measured using the above described modified difference signal D'(t,f), which is visualized in the graph of FIG. 4 by the hatched area.

Figure 5:
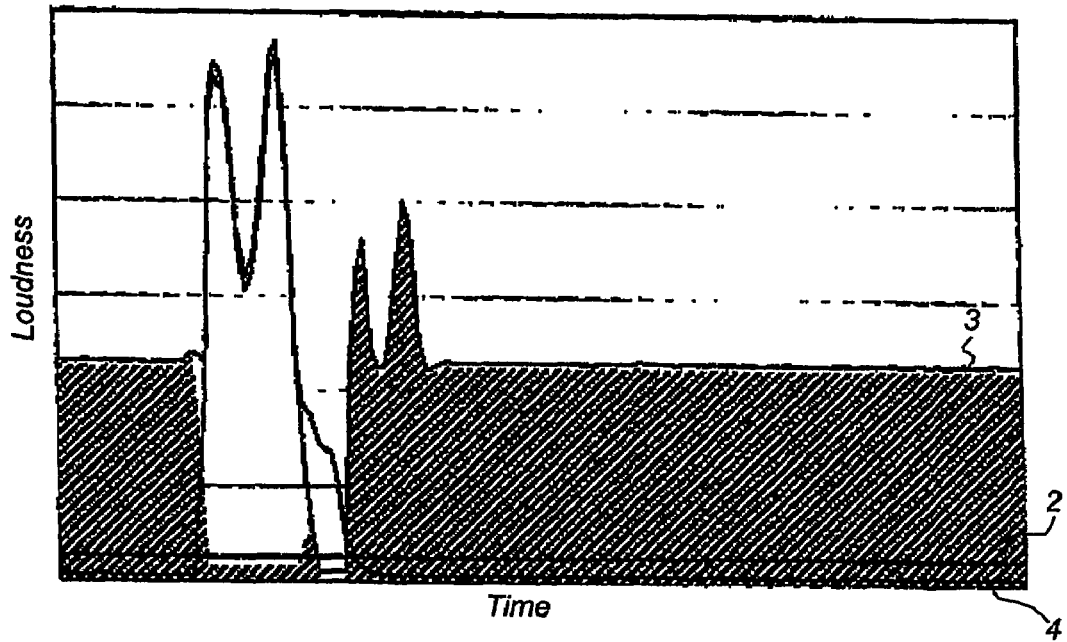
FIG. 5 shows a graph representing the reference speech signal, return signal, determined background noise level and the associated measure of talking quality according to the state of the art, in case a noise dip is present.

However, when during the measurement of the talking quality using the speech sample, a change takes place in the communication system which affects the background noise level, the known PESQM method may fail all together. This is visualized in the graph shown in FIG. 5. When during the talking quality measurement, the noise level of the returned signal 3 falls to a lower level, e.g. due to background noise switching, the known PESQM method will set the threshold noise level T(Ne) to the minimum level experienced during the entire speech sample. However, this will lead to a talking quality measurement using the modified difference signal D'(t,f) as indicated by the hatched area in FIG. 5, which will lead to an erroneous talking quality measurement.

Background noise switching can be caused by several circumstances, e.g. in VoIP telephony systems, which use voice activation detection. When a telephone conversation between side A and B takes place, some situations can be distinguished:

0. A is silent, B is silent
1. A speaks, B is silent
2. A speaks, B speaks
3. A is silent, B sends noise (B is in a place with environmental noise, e.g. street noise, machine noise, babble noise)
4. A speaks, B sends noise In case 0 both sides are silent. In this case silence (no noise), or only noise arising from the telephone connection, is heard by A or B.

Case 1 is called a single talk situation. B experiences a listening quality, A experiences a talking quality. The speech coming from A can be reflected at side B (acoustically or electrically) or in the network in between (electrically). This reflection can lead to A hearing his own speech. When this happens with a low delay, below about 20 ms, this is experienced by A as a direct side tone, which is a desirable feature of a telephone connection (if there is no side tone the line seems dead). When the reflection of A's speech arrives with a delay greater then 20 ms, A starts to notice this as a separate echo of his own voice, which is disturbing to the talker A. This echo becomes more disturbing with increasing delay or level of the echo.

Echo Control (EC) is the cancellation or suppression of the echo. An echo canceller uses the speech coming from A to make a prediction of the echo and subtracts this from the signal from B to A: now the echo is cancelled. An echo suppressor cancels or suppresses the speech from B to A, when A is talking: now the echo from B to A is suppressed.

Case 2 is called double talk. In this case both parties are talking, which masks echo and noise in both directions. This masking reduces possible echo problems. PESQM was not developed for double talk situations.

In case 3 noise is transmitted from B to A. This gives A information on the environment of B, and indicates that the connection is still open. Noise suppression can reduce the noise level.

In case 4 the situation changes from case 3, because A starts talking. Without EC and noise suppressors, A can hear an echo of his own voice, added to the noise coming from B. The noise masks the echo, but if the echo level is higher than the background noise level, it will again be disturbing to A. With EC the echo perceived by A can be reduced, but the EC can also influence the noise from B to A. Especially echo suppressors can reduce the noise level when they start suppressing (in case 4). Going from case 4 to case 3 the suppressor stops suppressing which leads to an instant rise of the noise perceived by A. This change in noise level is called background noise switching, which is disturbing to A. Noise suppressors can also cause background noise switching. To prevent background noise switching EC and noise suppressors can create a noise signal comparable to the real noise and add this to the signal toward A when the real noise is suppressed. This is called comfort noise injection. When comfort noise injection is not used or not good enough, the background noise switching remains.

Going from case 4 to case 3 the background noise switching can happen shortly (a few ms) after A stops talking, instead of immediately, because the EC doesn't respond fast enough. In this case the suppression of echo and noise leads to noise suppression during the first few ms of case 3, see curve 3 in FIG. 4 versus curve 3 in FIG. 5. The dip in the background noise level in FIG. 5, shortly called noise dip, leads to a wrong estimate of the overall background noise level, if this is based on the minimum level.

Echo is relevant in networks with high delays (e.g. mobile networks, VoIP, long distance calls) or high levels of reflections (e.g. electrically in the 4/2 wire hybrid in analog telephone sets or acoustically via handsfree sets (in-car, via computer speakers) or acoustically bad designed (mobile) handsets.

Figure 6:
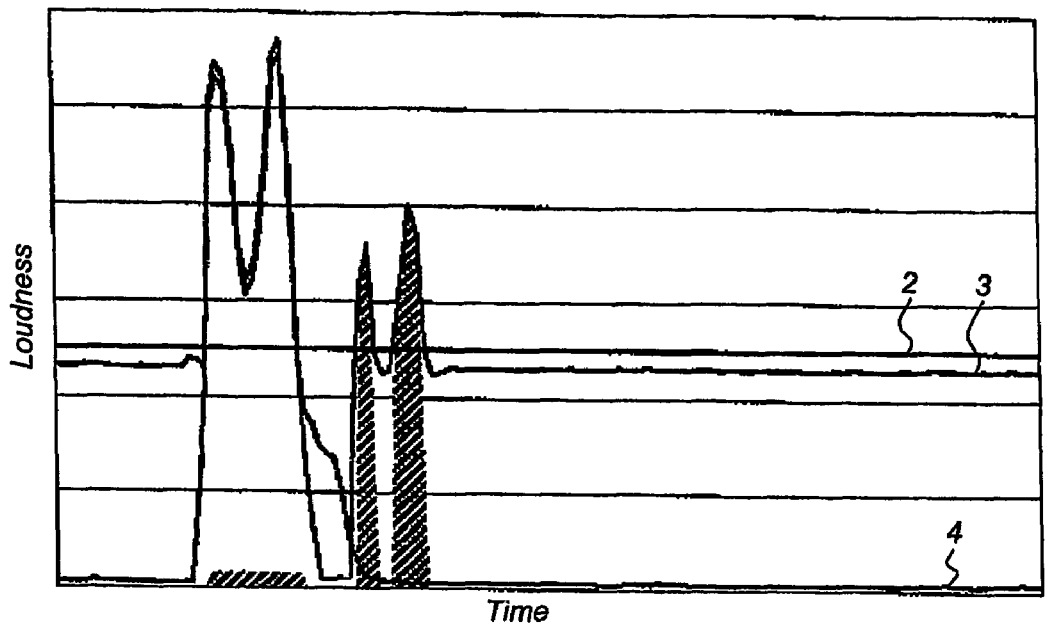
FIG. 6 shows a graph representing the reference speech signal, return signal, determined background noise level and the associated measure of talking quality according to an embodiment of the present invention.

In FIG. 6, the result of a first embodiment of the present invention is shown. In this embodiment, the speech sample comprises a silence period at the start, e.g. for a period of 0.9 sec. The threshold noise value is determined using the same kind of processing as in the known PESQM method, but only for the returned signal 3 corresponding to the silence period in the speech sample. During the silence period of the speech sample, the communication network will not yet be prone to background noise switching, thus leading to a reliable determination of the talking quality measurement. The speech sample as used to determine the talking quality measurement may in a further example comprise a silence period and a number of actual speech samples, e.g. five. The threshold value is then determined from the returned signal 3 only during the interval corresponding to the silence period of the speech sample, and used in the talking quality measurement for all the speech samples. Also, as the PESQM method is suited to operate on stored speech samples, it is possible to add the returned signal part corresponding to the silence period to each of the five speech samples, and determine the talking quality for each of the combined speech samples, which all include a silence period.

Figure 7:
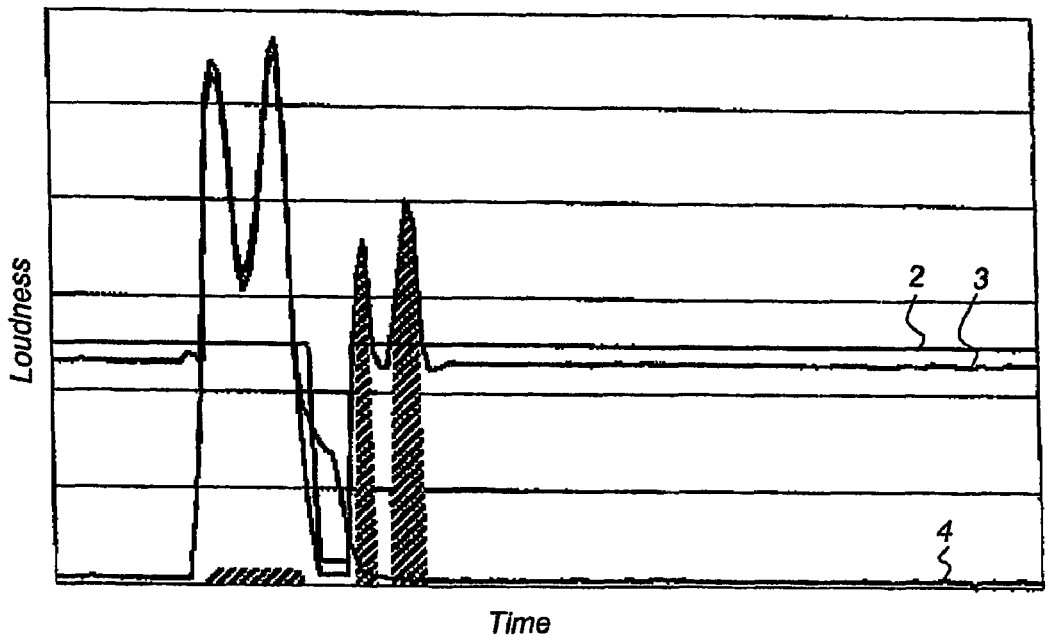
FIG. 7 shows a graph representing the reference speech signal, return signal, determined background noise level and the associated measure of talking quality according to a further embodiment of the present invention.

In FIG. 7, the result of a further embodiment of the present invention is shown. In general, the talking quality measurement is implemented by calculating the relevant parameters and signals in frames of e.g. 32 ms. In this further embodiment, the threshold noise level T(Ne) is determined as a varying threshold following the local minimum level for a small number of successive frames. In case of background noise switching, as depicted in FIG. 7 as occurring just after the first speech utterance, the threshold noise level dynamically follows the returned signal 3. When the background noise shows a dip, the threshold noise level T(Ne) is lowered for a number of frames, and then is raised when the echo signal is present in the returned signal. As the returned signal also shows a much lower loudness level during the background noise dip, the resulting modified difference signal D'(t,f) is not erroneous.

In an even further embodiment of the present invention, the threshold noise level is determined from the returned signal 3 using stochastic properties. A known characteristic of the returned signal 3 is that in time, it will show some peaks corresponding to the speech utterances in the speech sample ((distorted) sidetone and echo). Possibly the return signal will show some temporal lower values due to e.g. background noise switching. For the most part, however, the returned signal will represent the noise level. The stochastic property used may e.g. be to calculate the median value of the returned signal, and use this median value as the threshold noise level T(Ne). Also, it is possible to determine the minimum value of the return signal 3, only for return signal portions (e.g. 32 ms frames) for which the return signal 3 value is within a predetermined range (excluding the actual speech signal in the return signal 3, and also the spurious low level values due to background noise switching). The result of this embodiment will be substantially equal to the result of the embodiment as shown in FIG. 6.

For the measuring of the talking quality it is necessary that the representation signal R'(t,f) is a representation of the signal combination of the talker speech signal and the returned signal. To realise this, however, it is not necessary that the degraded signal s'(t) is a signal combination of these two signals as indicated in FIG. 2 (signal combinator 24) and in FIG. 3 (s'(t)=s(t)⊕r(t)). It is also possible to use the returned signal (r(t)) as the degraded signal (s'(t)) and to obtain an intermediate signal in an intermediate stage of processing the reference signal, as carried out by the perception modelling means 38, which then is combined with a corresponding intermediate signal (Ps'(f)) obtained in a corresponding intermediate stage of processing the degraded signal, as carried out by the perception modelling means 39. Preferably the intermediate signal is a Fast Fourier Transform power representation (Ps(f)) of the reference speech signal (s(t)). This modification is shown schematically in FIG. 8 more in detail. The perceptual modelling means 38 and 39 carry out in a first stage of processing as usual (see ITU-T recommendation P.861: Objective quality measurement of telephone band (330-3400 Hz) speech codecs, August 1996), respectively indicated by boxes 51 and 52, a step of determining a Hanning window (HW) followed by a step of determining a Fast Fourier Transform (FFT) power representation in order to produce the intermediate signals Ps(f) and Pr(f), which are FTT power representations of the talker speech signal s(t) and the degraded signal s'(t) which now equals the returned signal r(t), respectively. In a second stage of processing, respectively indicated by boxes 53 and 54, a step of frequency warping (FW) to pitch scale is carried out followed by steps of frequency smearing (FS) and intensity warping (IW), in order to produce the representation signals R(t,f) and R'(t,f). Between the first and second stages, as indicated by the boxes 52 and 54, an intermediate signal addition of the intermediate signals Ps(f) and Pr(f), indicated by signal adder 55, is carried out, the intermediate signal sum in addition being the input of the second processing stage (box 54). Before the intermediate signal addition can be applied, the intermediate signal P(s(f)) has to be scaled to the correct level as usual.

Consequently, when using such an intermediate signal addition (Ps(f)⊕Pr(f)) inside the perception modelling means, instead of the external addition (s'(t)=s(t)⊕r(t)), the combination circuit 24 becomes superfluous. In case a device as described with reference to FIG. 3, having included the modification as described with reference to FIG. 8, is used directly in a telephone link, in a way as already described in PCT/EP00/08884, then the input ports 33 and 34 of the device may be directly coupled to the four-wire parts 17 and 18 of the forward and return channel, respectively, of a telephone link.

The invention claimed is:

1. Method for measuring a talking quality of a communication link in a communications network, the method comprising:
   a main step of subjecting a degraded speech signal s'(t) with respect to a reference speech signal s(t) to an objective measurement technique for measuring a perceptual quality of speech signals, and producing a quality signal q which represents an estimated value concerning the talking quality degradation;
   the degraded speech signal comprising a returned signal r(t);
   in which the objective measurement technique comprises a step of modelling masking effects in consequence of noise present in the returned signal comprising the determination of a dynamic threshold noise level, by determining successive local minimum values of the degraded speech signal s'(t).

2. Method according to claim 1, in which the reference speech signal s(t) comprises a silence period and the threshold noise level is determined in the part of the degraded speech signal s'(t) corresponding to the silence period in the reference speech signal s(t).

3. Method according to claim 2, in which the silence period is provided at the start of the reference speech signal s(t).

4. Method according to claim 3, in which the silence period has a duration of at least 0.5 sec, more preferably at least 0.9 sec.

5. Method according to claim 1, in which the threshold noise level is estimated as local minimum values of successive parts of the degraded speech signal s'(t).

6. Method according to claim 1, in which the threshold noise level is estimated as the local minimum value of the degraded speech signal s'(t) in a predefined value range.

7. Method according to claim 1, in which the main step comprises:
   a first processing step of processing the degraded speech signal s'(t) and generating a first representation signal R'(t,f);
   a second processing step of processing the reference speech signal s(t) and generating a second representation signal R(t,f);
   a step of subtracting the first representation signal from the second representation signal as to produce a difference signal D(t,f);
   a first substep of producing an estimated value Ne of the loudness of the noise present in the returned signal; and
   a second substep of noise suppression carried out on the difference signal using said produced estimated value Ne as to produce the modified difference signal D'(t,f); and
   a step of integrating the modified difference signal D'(t,f) with respect to frequency and time as to produce the quality signal q.

8. Device for measuring a talking quality of a communication link in a communications network, the device comprising:

measurement means connected to the communication link, the measurement means being arranged to subject a degraded speech signal s'(t) with respect to a reference speech signal s(t) to an objective measurement technique for measuring a perceptual quality of speech signals, and producing a quality signal (q) which represents an estimated value concerning the talking quality degradation;

the degraded speech signal comprising a returned signal r(t);

in which the measurement means are arranged to execute the objective measurement technique by modelling masking effects in consequence of noise present in the returned signal in which the objective measurement technique comprises the determination of a dynamic threshold noise level by determining successive local minimum values of the degraded speech signal s'(t).

9. Device according to claim 8, in which the reference speech signal s(t) comprises a silence period and the measurement means are further arranged to determine the threshold noise level in the part of the degraded speech signal s'(t) corresponding to the silence period in the reference speech signal s(t).

10. Device according to claim 9, in which the silence period is provided at the start of the reference speech signal s(t).

11. Device according to claim 10, in which the silence period has a duration of at least 0.5 sec, more preferably at least 0.9 sec.

12. Device according to claim 8, in which the measurement means are arranged to estimate the threshold noise level as local minimum values of successive parts of the degraded speech signal s'(t).

13. Device according to claim 8, in which the measurement means are arranged to estimate the threshold noise level as the local minimum value of the degraded speech signal s'(t) in a predefined value range.

14. Device according to claim 8, in which the device comprises:

first processing means for processing the degraded speech signal s'(t) and generating a first representation signal R'(t,f), the first representation signal R'(t,f) being a representation signal of a signal combination of the talker speech signal and the returned signal;

second processing means for processing the talker speech signal s(t) and generating a second representation signal R(t,f);

combining means for combining the first and second representation signals as to produce said output signal q, the combining means including subtracting means for subtracting the first representation signal from the second representation signal as to produce a difference signal D(t,f);

modelling means for modelling the masking effects carried out on the difference signal as to produce a modified difference signal, including means for producing an estimated value Ne of the loudness of the noise present in the returned signal, and means for carrying out a noise suppression on the difference signal using said produced estimated value Ne, and for producing the modified difference signal D'(t,f); and integrating means for integrating the modified difference signal with respect to frequency and time as to produce the quality signal q.

* * * * *